Figure 3:
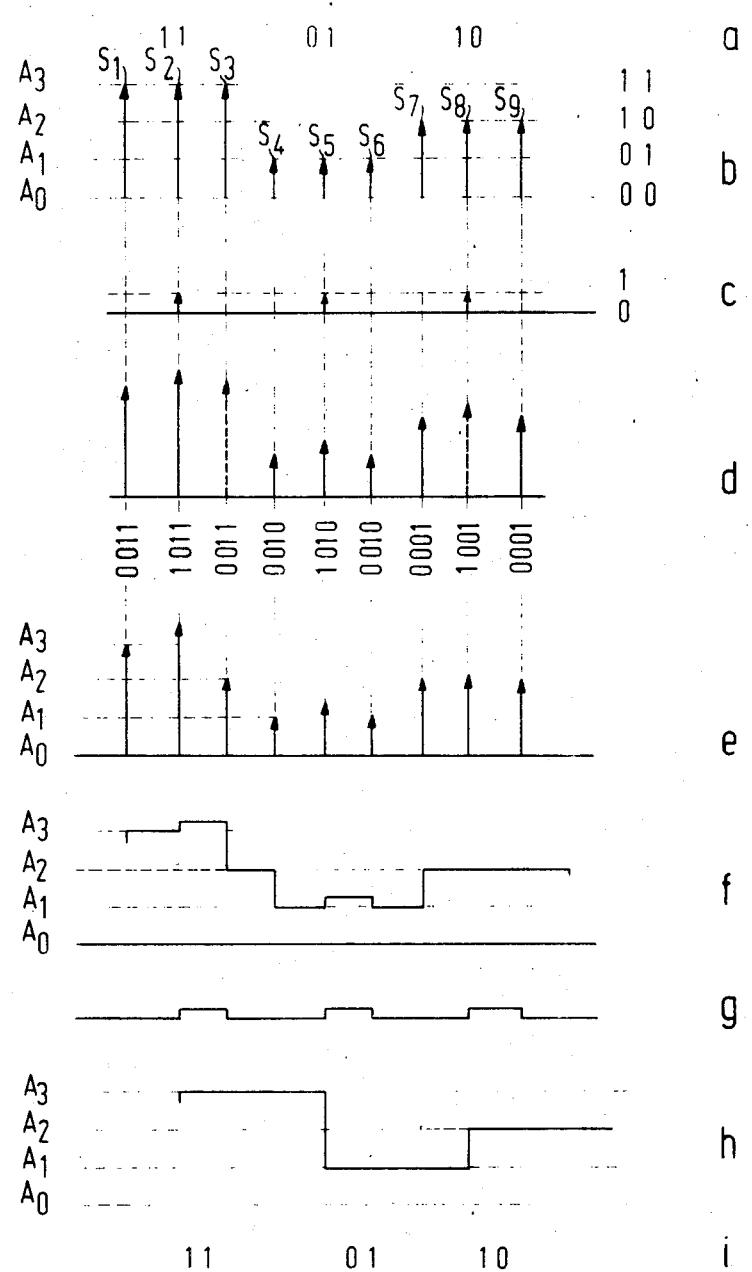

United States Patent [19]

Baggen

[11] Patent Number: 4,667,317

[45] Date of Patent: May 19, 1987

[54] METHOD FOR THE STORAGE ON AND THE REPRODUCTION FROM AN OPTICALLY READABLE RECORD CARRIER

[75] Inventor: Constant P. M. J. Baggen, Eindhoven, Netherlands

[73] Assignee: U.S. Philips Corporation, New York, N.Y.

[21] Appl. No.: 504,023

[22] Filed: Jun. 13, 1983

[30] Foreign Application Priority Data

Mar. 17, 1983 [NL] Netherlands ......................... 8300961

[51] Int. Cl.[4] ..................... G11B 20/12; G11B 20/18; G11B 7/013
[52] U.S. Cl. ..................................... 369/59; 369/111; 360/32; 360/38.1; 360/47; 360/48; 371/69; 371/31
[58] Field of Search .................. 369/59, 111; 360/32, 360/38.1, 48, 47, 53; 371/69, 31

[56] References Cited

U.S. PATENT DOCUMENTS

| | | | |
|---|---|---|---|
| 2,628,346 | 2/1953 | Burkhart | 360/47 |
| 4,022,986 | 5/1977 | Leer | 369/59 |
| 4,041,453 | 8/1977 | Umeda | 360/38.1 |
| 4,277,807 | 7/1981 | Baldwin | 360/38.1 |
| 4,375,101 | 2/1983 | Cerracchio | 371/69 |
| 4,414,585 | 11/1983 | Gestel | 360/48 |
| 4,455,635 | 6/1984 | Dieterich | 360/38.1 |
| 4,464,714 | 8/1984 | Huijser | 369/59 |

OTHER PUBLICATIONS

Philips Technical Review; Compact Disc Digital Audio, vol. 40, 1982, No. 6.

*Primary Examiner*—Alan Faber
*Attorney, Agent, or Firm*—Robert T. Mayer; Algy Tamoshunas

[57] ABSTRACT

A method for storing and reproducing data by means of a standard compact-disk digital audio player. The bit groups in which the data words are contained are recorded at least three times, the analog output signal of the player being sampled and digitized during reproduction.

20 Claims, 3 Drawing Figures

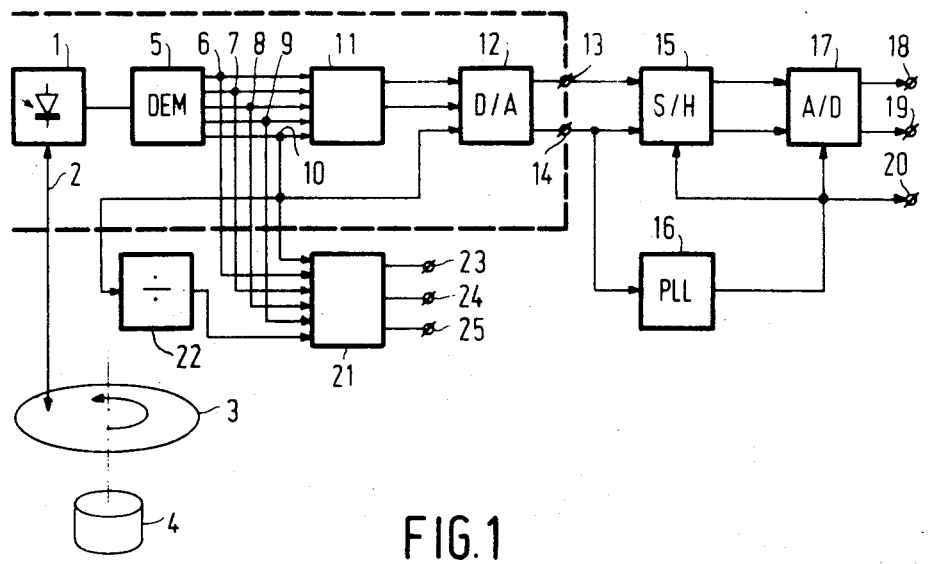
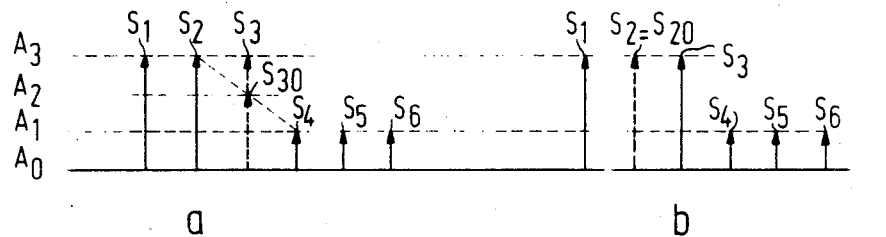
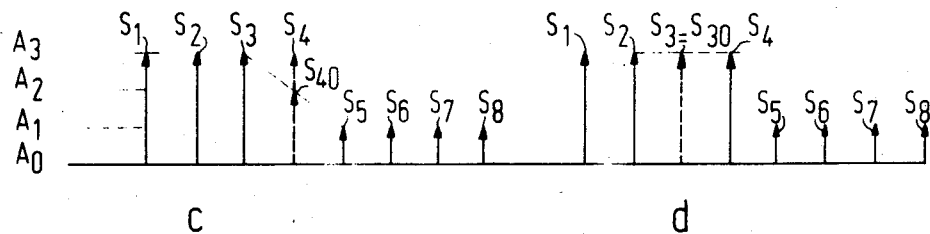
FIG.1
FIG.2

METHOD FOR THE STORAGE ON AND THE REPRODUCTION FROM AN OPTICALLY READABLE RECORD CARRIER

The invention relates to a method of storing groups of n bits on and reproducing them from an optically readable record carrier. Each of the groups represents an analog signal value, with the groups being recovered from a signal obtained by reading said record carrier during reproduction. The groups are then subjected to an interpolation process, in which a group to be substituted for an unreliable group is generated from groups situated on both sides of the unreliable group by interpolation of said groups. Subsequently a digital-to-analog converter converts said groups into the corresponding analog signal values.

The invention also relates to a record carrier for use in the method.

The invention also relates to a first apparatus for use in the method, comprising a read apparatus, a decoding circuit for recovering groups of n bits which each represent an analog signal value from the signal read, an interpolation circuit for generating a substitute group for an unreliable group by interpolation of the groups situated on both sides of said unreliable group, and a digital-to-analog converter for converting said groups into the corresponding analog signal values.

Moreover, the invention relates to a second apparatus for use in the method.

Such a method, record carrier and apparatus are known from Philips Technical Review, Vol. 40, 1982, No. 6, the complete issue, which issue is herewith incorporated by reference. Such apparatuses and record carriers are commercially available under the designation Compact Disk Digital Audio System and are used for reproducing audio information which is recorded on the optically readable record carrier in digitally coded form.

In the same way as audio cassettes, such a record carrier may be used for the storage of other data, in particular computer data, such as computer programs and computer games. However, the risk of an erroneous bit group is too great for this purpose. In the case of digital audio such errors are largely masked by said interpolation, which is effective in the case of digital audio because adjacent bit groups represent correlated signal values and the substitute signal value obtained through interpolation will generally be compatible with the original signal value. However if, as in the case of computer data, the bit groups are uncorrelated, the interpolation will result in a bit group which has no relation with the original bit group. Thus, for such a use interpolation is unlikely to improve the error probability.

It is the object of the invention to provide a method of the type mentioned in the opening paragraph which enables data to be stored and reproduced in a simple manner and with reduced error probability. The method in accordance with the invention is characterized in that $2^m (m \geq 1)$ analog signal values, which are each representative of a data word of m bits correspond to the groups of n bits. The data words are each stored on the record carrier in the form of k ($k \geq 3$) groups representing said data word, and per period corresponding to k groups which are representative of said data word, the analog signal obtained by digital-to-analog conversion is sampled at an instant which is situated from both limits of said period of k groups at least at a time interval corresponding to the repetition period of the groups in the signal obtained after readout.

The invention is based on the recognition that in this way using a standard compact-disk digital audio player including the interpolation circuit it is yet possible to store and reproduce data in a reliable manner because by repeating said groups at least three times and subsequently sampling them at the correct instant, erroneous interpolations cannot be generated by interpolating at the sampling instant.

The record carrier for use in the inventive method may be characterized in that the recorded signal comprises groups of n bits which correspond to $2^m (m \geq 1)$ analog signal values which are each representative of a data word of m bits, said data words each being stored in the form of k ($k \geq 3$) groups representing said data word.

The first apparatus of the type mentioned in the introductory part for use in the method in accordance with the invention may be characterized by a sampling circuit for sampling the obtained analog signal per period corresponding to k groups representative of said data word at an instant which is situated within both limits of said period of k groups at least at a time interval corresponding to the repetition period of the groups in the output signal of the decoding circuit.

The second apparatus for use in the method in accordance with the invention may be characterized in that the apparatus is provided with an analog input for receiving a signal from a compact-disk digital audio player, a sampling circuit for sampling the analog signal received per period corresponding to k groups representative of said data word at an instant which is situated from both limits of said period of k groups at least at a time interval corresponding to the repetition period of the groups, an analog-to-digital converter whose input is connected to the output of the sampling circuit, and an output for a digital signal, which output is connected to the output of the analog-to-digital converter.

This second apparatus has the advantage that a first apparatus is obtained by connection to the output of an existing player for audio-signal reproduction.

The method and the record carrier may further be characterized in that the m most significant bits of the groups of n bits directly constitute the data word of m bits.

In this way the data words can be recovered very simply from the output signal of the sampling circuit by means of an A/D converter.

In order to obtain clock information in a simple manner the method and the record carrier in accordance with the invention may further be characterized in that a clock modulation is inserted at one of the n bits which is less significant than the m most significant bits.

In this respect it is advantageous that the period of the clock modulation corresponds to the duration of k groups.

As a result of this step the frequency of this clock information is situated in a zero point of the data-information spectrum because the clock frequency is then $2\times$ the repetition frequency of the data words.

This version of the method and the record carrier may further be characterized in that k is an even number and the clock modulation is obtained in that the bit intended for the clock modulation alternately assumes one of two logic levels every k/2 groups.

Thus, a clock signal of a symmetrical shape, which is simple to process electronically, is obtained in the analog signal.

Specifically, a preferred version of the method and the record carrier in accordance with the invention may be characterized in that n=16 and m=10, the clock modulation is inserted in the 13$^{th}$ bit, and the 11$^{th}$ and 12$^{th}$ bit have a fixed logic value, and that after sampling the signal is subjected to an analog-to-digital conversion.

For the recovery of the digital data words the first apparatus may further be characterized in that an analog-to-digital converter is arranged after the sampling circuit.

For the recovery of a clock signal the first apparatus may further be characterized in that the apparatus further comprises a filter which is tuned to the clock frequency and which is connected to the output of the digital-to-analog converter, and a phase-locked loop for deriving a clock frequency for controlling the sampling circuit from the analog signal, and the second apparatus may further be characterized in that the apparatus further comprises a filter which is tuned to the clock frequency and which is connected to the analog input, and a phase-locked loop for deriving a clock frequency for controlling the sampling circuit from the analog signal.

The invention will now be described in more detail, by way of example, with reference to the drawing, in which FIG. 1 shows an apparatus for carrying out the method in accordance with the invention, FIG. 2, consisting of a-d, shows some diagrams to illustrate the operation of the interpolation circuit in said apparatus, FIG. 3, consisting of a-i, shows some diagrams to explain the operation of said apparatus.

FIG. 1 shows an apparatus for carrying out the method in accordance with the invention. It comprises an optical read apparatus 1 which reads a disk-shaped record carrier 3, driven by a drive means 4, by means of a laser beam 2. The signal read is applied to a decoder circuit 5, in which the signal is modulated, arranged and subjected to an error correction process in conformity with the standard compact-disk digital audio system. 16-bit digital audio signals appear on output 6 for the left-hand channel and on output 8 for the right-hand channel. Outputs 7 and 9 supply reliability flags for the digital samples in the left-hand and the right-hand channel, respectively. Output 10 supplies a clock signal representing the sampling frequency (44.1 kHz). These signals are applied to an interpolation circuit 11 which generates a new sample when the reliability flag indicates that this sample is unreliable. Moreover, circuit 11 may be designed so that the signal is suppressed temporarily when too many unreliable samples appear, which depending on the version, may already be the case in the event of two consecutive erroneous samples. The output signal of the interpolation circuit 11, together with the sampling frequency, is applied to a D/A converter 12, which produces an analog signal on outputs 13 (left-hand channel) and 14 (right-hand channel), which converter also comprises a low-pass filter. So far the apparatus corresponds to a standard compact-disk digital audio player.

FIG. 2 illustrates the operation of the interpolation circuit 11 when, in accordance with the invention, each sample is repeated at least three times. FIG. 2a shows these samples $S_1$, $S_2$ and $S_3$ with corresponding analog signal values $A_3$ followed by three samples $S_4$, $S_5$ and $S_6$ with the analog signal values $A_1$. When the reliability flag indicates that sample $S_3$ is unreliable, a sample $S_{30}$ is generated with a corresponding analog signal value $A_2 = \frac{1}{2}(A_1 + A_3)$ between the analog signal values of the samples $S_2$ and $S_4$. If as indicated in FIG. 2b the sample $S_2$ is unreliable, the interpolation circuit replaces it by the sample $S_{20}$ of a corresponding signal value between the signal values of the samples $S_1$ and $S_3$ and consequently identical to the sample $S_2$. When a sample is repeated three times the central sample is always correct in the case of interpolation of one erroneous sample, regardless of which sample is obtained by interpolation.

FIGS. 2c and 2d represent a situation in which the samples are repeated four times. Four identical samples $S_1$ to $S_4$ are shown, followed by four identical samples $S_5$ to $S_8$ of corresponding signal values $A_3$ and $A_1$, respectively. In FIG. 2c it is assumed that the sample $S_4$ is incorrect. The interpolation circuit then generates a sample $S_{40}$ of the analog signal value $A_2$. In the situation of FIG. 2d it is assumed that the sample $S_3$ is not correct. The interpolation circuit then generates an identical sample $S_{30}$. Both the sample $S_2$ and $S_3$ remain correct regardless of the place of an incorrect sample.

In general it is therefore correct to state that when each sample is repeated at least three times the corresponding analog signal values within each block of repeated samples are correct in the range which is situated within the limits of each block at least at a time interval equal to the repetition period of the samples provided that the number of consecutive erroneous samples is not greater than two, although these situations may also turn out to be correct in the case of a corresponding extension of the blocks and the interpolation period. For example, two consecutive incorrect samples upon insertion of the samples by interpolation do no present problems when each sample is repeated five times or more.

The invention is based on the insights outlined in the foregoing. The apparatus shown in FIG. 1 therefore comprises a sampling circuit 15 for sampling the analog output signals on outputs 13 and 14 (in principle it is also possible to use only one of the two channels) at the correct instants. For this purpose a clock signal is derived from the analog signal on output 14, for example by means of a phase-locked loop 16. The output signal on the output of the sampling circuit 15 is converted into a digital code by means of an analog-to-digital converter 17, which code appears on output 18 (left-hand channel) and 19 (right-hand channel) together with the clock signal on output 20.

FIG. 3 illustrates the operation by means of example where 2-bit data words are stored via 4-bit samples which are repeated three times. FIG. 3a shows three consecutive data words 11, 01 and 10. They may be represented by a selection out of four analog signal values $A_0$, $A_1$, $A_2$ and $A_3$. In the case of a selection in accordance with a binary series the values $A_0$, $A_1$, $A_2$ and $A_3$ respectively correspond to the data words 00, 01, 10 and 11 and may therefore be recorded directly on the record carrier as two bits of samples S. When each sample is repeated three times the pattern shown in FIG. 3b is obtained. After read-out and digital-to-analog conversion, the pattern, in conformity with the invention, should be sampled at the location of the samples $S_2$, $S_5$, $S_8$. For this purpose a clock signal as shown in FIG. 3c may be provided, which signal comprises one bit which assumes the logic value 1 at the location of the samples $S_2$, $S_5$, $S_8$. This bit may be added to the samples S at some distance (for example one bit) as a less-significant bit, so that four-bit samples are obtained. After read-out and demodulation this yields the signal shown in FIG. 3d on the output of the demodulator 5. It is now assumed that the samples $S_3$ and $S_8$ are incorrect. The interpolation circuit 11 then inserts a sample of the corresponding analog signal value $A_2$ instead of $A_3$ for the sample $S_3$, while for the sample $S_8$ the clock modulation disappears. Thus, the signal shown in FIG. 3e appears on the output of the interpolation circuit 11. That signal is converted into a signal shown in FIG. 3f (when the filtration is ignored) by the D/A converter 12, which signal has the incorrect value $A_2$ at the location or sample $S_3$ and from which the clock modulation is missing at the location of the sample $S_8$. By means of the filter and phase-locked loop circuit 16 the clock signal is derived (FIG. 3g), said phase-locked loop inserting the missing clock pulse at the location of the sample $S_8$ without any problems. After sampling the signal shown in FIG. 3h is obtained on the output of this sampling circuit 15, which signal is converted into the logic signal shown in FIG. 3i by the A/D converter 17, the A/D converter in the present example being a two-bit converter because the two least-significant bits need not be converted. Thus, the erroneous samples $S_2$ and $S_8$ do not disturb the reproduction of the logic signal shown in FIG. 3a.

In the present example a repetition of three times is used. In a practical example, in which 10-bit data words are accommodated in 16-bit samples as most significant bits, the clock modulation being applied to the $13^{th}$ bit (note that the clock modulation must be added to only one of the two stereo channels when the information in the two channels allows this), a repetition of four times is chosen because then a symmetrical clock may be used with a change of the logic level after every $2^{nd}$ bit, i.e. in the example shown in FIG. 3c between the samples $S_2$ and $S_3$, $S_4$ and $S_5$, $S_6$ and $S_7$, etc., which simplifies the logic. It is to be noted that a repetition of four or more times is advantageous in comparison with three times repetition because in the case of three times repetition sampling must be effected exactly at the central bit group, which imposes stringent requirements on the stability of the clock signal. The choice of a clock with a frequency which is twice as high as the repetition frequency of the data words (FIG. 3i) moreover has the advantage that this clock then appears in a zero point of the frequency spectrum of the data words.

In the manner described in the foregoing a standard compact-disk digital audio player may be adapted for the transfer of data signals, in particular non-intercorrelated data words, without modifying the player, in which case the error probability would be too high if no additional steps were taken. Because in general said player is already in use for audio purposes, it may be advantageous to design an adaptor comprising the sampling circuit 15, the phase-locked loop 16 and the analog-to-digital converter 17.

Obviously, it is possible to achieve an additional error correction in the coding of the data words themselves by means of parity bits and the like.

In the decoder 5, the samples are provided with a reliability flag. In principle, it would therefore be possible to always select a reliable sample from the groups of three or more samples without the use of the inventive principle. However, then it is necessary to equip the player with an output such that the interpolation circuit 11 has no undesired effects, but this has the disadvantage that for this purpose standard compact-disk digital audio players have to be modified. By way of illustration FIG. 1 shows such a modification. For this purpose the outputs 6 to 9 of the decoder device 5 are connected to a selection device 21 in which one reliable sample is selected from each group, and applied directly in digital form to an output 23 (left-hand channel) and output 24 (right-hand channel), respectively. All 16 bits of each sample may then be utilized for the data word. For the purpose of synchronization the sampling frequency on the output 10 of the demodulation circuit is divided by the number of samples per data word by means of a divider stage 22, steps being taken to ensure the correct phase relationship. This clock frequency is also applied to an output 25. The player modified in this manner is suitable for use with record carriers in which all 16 bits are employed for data storage.

The complete apparatus shown in FIG. 1 may be advantageous because it is suitable for both systems and, if desired, for audio reproduction.

In principle, it is also possible to store and reproduce one-bit data words. The A/D converter 17 is then a one-bit converter or discriminator.

What is claimed is:

1. A method of reproducing data words of m bits from a record carrier, each of said data words being stored on said record carrier in the form of a group of n bits, each group representing a given data word being repeated k times, where $k \geq 3$, each of said groups corresponding to one of $2^m (m \geq 1)$ analog signal values representing said data words, said method comprising the steps of reading said carrier so as to obtain a read-out signal containing said groups stored on said record carrier, recovering said groups from said read-out signal, subjecting said groups to an interpolation process wherein an unreliable group is replaced by an interpolated group which is generated by interpolation from groups situated on both sides of said unreliable group, converting each of said groups into a corresponding analog signal value so as to produce an analog signal and during a period corresponding to the duration of k groups which represent a given data word, sampling said analog signal produced during said converting step at an instant which is situated, from both the start and end of said period of k groups, at least at a time interval corresponding to the repetition period of said groups in said read-out signal.

2. A method as claimed in claim 1, wherein the m most-significant bits of the groups of n bits directly constitute the data word of m bits.

3. A method as claimed in claim 2, wherein a clock signal is stored on said record carrier in the form of a clock modulation inserted at one bit of the n bits, which is less significant than the m most significant bits.

4. A method as claimed in claim 3, wherein the period of the clock modulation corresponds to the duration of k groups.

5. A method as claimed in claim 4, wherein k is an even number and the clock modulation is obtained in that the bit intended for the clock modulation alternately assumes one of two logic levels every k/2 groups.

6. A method as claimed in claim 3, 4 or 5, wherein $n = 16$ and $m = 10$, the clock modulation is inserted in the $13^{th}$ bit, and the $11^{th}$ and $12^{th}$ bit having a fixed logic value.

7. A method as claimed in claim 1, 2, 3, 4 or 5 wherein after sampling the signal is subjected to an analog-to-digital conversion.

8. A record carrier having recorded thereon a signal in an optically readable form, said recorded signal being comprised of groups of n bits, each group corresponding to one of $2^m (m \geq 1)$ analog signal values, each analog signal value representing a data word of m bits, each group of n bits corresponding to one analog signal value and representing a given data word of m bits being repeated k times, where $k \geq 3$.

9. A record carrier as claimed in claim 8, wherein the m most-significant bits of the groups of n bits directly constitute the data word of m bits.

10. A record carrier as claimed in claim 9, wherein a clock modulation is inserted at one of the n bits which is less significant than the m most significant bits.

11. A record carrier as claimed in claim 10, wherein the period of the clock modulation corresponds to the duration of k groups.

12. A record carrier as claimed in claim 11, wherein k is an even number and the clock modulation is obtained in that the bit intended for the clock modulation alternately assumes one of two logic values every k/2 groups.

13. A record carrier as claimed in claim 10, 11 or 12, wherein n=16 and m=10, the clock modulation is inserted in the 13$^{th}$ bit and the 11$^{th}$ and 12$^{th}$ bit have a fixed logic value.

14. An apparatus for reproducing data from a record carrier, said data being recorded on said record carrier as a signal comprised of groups of n bits, each group corresponding to an analog signal value representing a data word of m bits and being repeated k times, where $k \geq 3$, said apparatus comprising means for reading said data recorded on said carrier to obtain a read-out signal, means for recovering, from said read-out signal, said groups of n bits, means for generating a substitute group for an unreliable group by interpolation of the groups situated on both sides of said unreliable group, means for converting said groups into corresponding analog signal values so as to produce an analog signal, means for periodically sampling said analog signal, with the sampling period corresponding to the duration of said k groups representing a given data word, said analog signal being sampled at an instant which is situated, from both the start and end of said period corresponding to said duration of said k groups, at least at a time interval corresponding to the repetition period of said groups in said read-out signal.

15. The apparatus according to claim 14 wherein said data are stored on said record carrier in an optically readable form, and said reading means includes means for directing a beam of radiation for scanning said record carrier.

16. An apparatus as claimed in claim 14 or 15 including means for converting values of said analog signal sampled by said sampling means into a corresponding digital signal.

17. An apparatus as claimed in claim 14 or 15 wherein a clock signal is stored on said record carrier in the form of a clock modulation inserted at one bit of the n bits, and said apparatus comprises means for recovering said clock signal from said analog signal produced by said converting means, and means for applying said clock signal to said sampling means so as to control said instant at which said analog signal is sampled.

18. The apparatus according to claim 17 wherein said clock signal recovering means includes a phase-locked loop.

19. A device for recovering data words of n bits from an analog signal produced by an optical digital audio player from an optical disc having stored thereon a recorded signal comprised of groups of n bits, each group representing one of said data words and being repeated k times, where $k \geq 3$, said device comprising an analog input for receiving said analog signal, a sampling circuit for sampling the analog signal during a period corresponding to k groups representative of said data word at an instant which is situated, from both the start and end of said period of k groups, at least at a time interval corresponding to the repetition period of the groups, and an analog-to-digital converter having an input which is connected to an output of the sampling circuit.

20. The device as claimed in claim 19 wherein said recorded signal includes a clock signal in the form of a modulation of one of said n bits, and wherein said device further comprises a filter which is tuned to the clock frequency and which is connected to the analog input, and a phase-locked loop for deriving a clock frequency for controlling the sampling circuit from the analog signal.

* * * * *